United States Patent
Nguyen et al.

(10) Patent No.: US 9,196,292 B1
(45) Date of Patent: Nov. 24, 2015

(54) ROTARY SPINDLE HAVING A DISK CLAMP BOTTOM LAND FACING AND IN CONTACT WITH A SHAFT TOP LAND

(71) Applicant: Western Digital Technologies, Inc., Irvine, CA (US)

(72) Inventors: Diep L. Nguyen, Castro Valley, CA (US); Ronald G. Ilagan, Santa Clara, CA (US); Klaus Kloeppel, Royal Oaks, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/615,339

(22) Filed: Feb. 5, 2015

(51) Int. Cl.
G11B 17/02 (2006.01)
G11B 17/028 (2006.01)

(52) U.S. Cl.
CPC .................. G11B 17/0284 (2013.01)

(58) Field of Classification Search
CPC ............ G11B 17/0287; G11B 25/043; G11B 17/038; G11B 17/2009; G11B 17/02; G11B 17/0284; G11B 19/20
USPC ................. 360/99.08, 99.12, 98.08; 720/706; 310/90, 67 R
See application file for complete search history.

(56) References Cited

U.S. PATENT DOCUMENTS

| | | | |
|---|---|---|---|
| 5,235,482 A | 8/1993 | Schmitz | |
| 5,373,407 A * | 12/1994 | Stupak et al. | 360/99.08 |
| 5,392,178 A * | 2/1995 | Nishio et al. | 360/99.08 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,104,570 A | 8/2000 | Pelstring | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,243,230 B1 * | 6/2001 | Nii et al. | 360/99.08 |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |

(Continued)

FOREIGN PATENT DOCUMENTS

| | | | | |
|---|---|---|---|---|
| JP | 2008228496 A | * | 9/2008 | |
| JP | 2012119016 A | * | 6/2012 | |
| KR | 2011004177 A | * | 1/2011 | |

Primary Examiner — Will J Klimowicz

(57) ABSTRACT

A rotary spindle has a rotatable shaft that defines a shaft axis of rotation, and has a shaft top land that is normal to the shaft axis of rotation. A disk mounting hub has an outer disk mounting surface, and has an inner cylindrical bore with an inner cylindrical surface that faces and is in radial compression with an outer cylindrical surface of the shaft at a cylindrical hub-to-shaft interface. The cylindrical hub-to-shaft interface is substantially concentric about the shaft axis of rotation. A disk clamp is fastened to the rotatable shaft, and the disk clamp has a clamp bottom land that faces and is in contact with the shaft top land.

16 Claims, 3 Drawing Sheets

(56) References Cited

U.S. PATENT DOCUMENTS

| | | |
|---|---|---|
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |

(56) References Cited

U.S. PATENT DOCUMENTS

| | | | |
|---|---|---|---|
| 7,280,319 B1 | 10/2007 | McNab | |
| 7,292,406 B1 | 11/2007 | Huang | |
| 7,298,584 B1 | 11/2007 | Yamada et al. | |
| 7,327,537 B1 | 2/2008 | Oveyssi | |
| 7,339,268 B1 | 3/2008 | Ho et al. | |
| 7,342,746 B1 | 3/2008 | Lin | |
| RE40,203 E | 4/2008 | Hatch et al. | |
| 7,353,524 B1 | 4/2008 | Lin et al. | |
| 7,369,368 B1 | 5/2008 | Mohajerani | |
| 7,372,670 B1 | 5/2008 | Oveyssi | |
| 7,375,929 B1 | 5/2008 | Chang et al. | |
| 7,379,266 B1 | 5/2008 | Ou-Yang et al. | |
| 7,381,904 B1 | 6/2008 | Codilian | |
| 7,385,784 B1 | 6/2008 | Berding et al. | |
| 7,388,731 B1 | 6/2008 | Little et al. | |
| 7,420,771 B1 | 9/2008 | Hanke et al. | |
| 7,434,987 B1 | 10/2008 | Gustafson et al. | |
| 7,436,625 B1 | 10/2008 | Chiou et al. | |
| 7,440,234 B1 | 10/2008 | Cheng et al. | |
| 7,477,488 B1 | 1/2009 | Zhang et al. | |
| 7,477,489 B1 | 1/2009 | Chen et al. | |
| 7,484,291 B1 | 2/2009 | Ostrander et al. | |
| 7,505,231 B1 | 3/2009 | Golgolab et al. | |
| 7,529,064 B1 | 5/2009 | Huang et al. | |
| 7,538,975 B2 * | 5/2009 | Lee et al. | 360/98.08 |
| 7,538,981 B1 | 5/2009 | Pan | |
| 7,561,374 B1 | 7/2009 | Codilian et al. | |
| 7,567,410 B1 | 7/2009 | Zhang et al. | |
| 7,576,955 B1 | 8/2009 | Yang et al. | |
| 7,593,181 B1 | 9/2009 | Tsay et al. | |
| 7,605,999 B1 | 10/2009 | Kung et al. | |
| 7,609,486 B1 | 10/2009 | Little | |
| 7,610,672 B1 | 11/2009 | Liebman | |
| 7,633,721 B1 | 12/2009 | Little et al. | |
| 7,633,722 B1 | 12/2009 | Larson et al. | |
| 7,656,609 B1 | 2/2010 | Berding et al. | |
| 7,660,075 B1 | 2/2010 | Lin et al. | |
| 7,672,083 B1 | 3/2010 | Yu et al. | |
| 7,684,155 B1 | 3/2010 | Huang et al. | |
| 7,686,555 B1 | 3/2010 | Larson et al. | |
| 7,709,078 B1 | 5/2010 | Sevier et al. | |
| 7,715,149 B1 | 5/2010 | Liebman et al. | |
| 7,729,091 B1 | 6/2010 | Huang et al. | |
| 7,751,145 B1 | 7/2010 | Lin et al. | |
| 7,826,177 B1 | 11/2010 | Zhang et al. | |
| 7,852,601 B1 | 12/2010 | Little | |
| 7,864,488 B1 | 1/2011 | Pan | |
| 7,880,354 B2 | 2/2011 | Higashihara et al. | |
| 7,898,770 B1 | 3/2011 | Zhang et al. | |
| 7,903,369 B1 | 3/2011 | Codilian et al. | |
| 7,907,369 B1 | 3/2011 | Pan | |
| 7,911,742 B1 | 3/2011 | Chang et al. | |
| 7,926,167 B1 | 4/2011 | Liebman et al. | |
| 7,933,093 B2 * | 4/2011 | Tomita | 360/99.12 |
| 7,957,095 B1 | 6/2011 | Tsay et al. | |
| 7,957,102 B1 | 6/2011 | Watson et al. | |
| 7,961,436 B1 | 6/2011 | Huang et al. | |
| 8,004,782 B1 | 8/2011 | Nojaba et al. | |
| 8,007,175 B2 | 8/2011 | Watanabe et al. | |
| 8,009,384 B1 | 8/2011 | Little | |
| 8,018,687 B1 | 9/2011 | Little et al. | |
| 8,031,431 B1 | 10/2011 | Berding et al. | |
| 8,064,168 B1 | 11/2011 | Zhang et al. | |
| 8,064,170 B1 | 11/2011 | Pan | |
| 8,068,314 B1 | 11/2011 | Pan et al. | |
| 8,081,401 B1 | 12/2011 | Huang et al. | |
| 8,100,017 B1 | 1/2012 | Blick et al. | |
| 8,116,038 B1 | 2/2012 | Zhang et al. | |
| 8,125,740 B1 | 2/2012 | Yang et al. | |
| 8,142,671 B1 | 3/2012 | Pan | |
| 8,156,633 B1 | 4/2012 | Foisy | |
| 8,159,785 B1 | 4/2012 | Lee et al. | |
| 8,189,298 B1 | 5/2012 | Lee et al. | |
| 8,194,348 B2 | 6/2012 | Jacoby et al. | |
| 8,194,354 B1 | 6/2012 | Zhang et al. | |
| 8,194,355 B1 | 6/2012 | Pan et al. | |
| 8,203,806 B2 | 6/2012 | Larson et al. | |
| 8,223,453 B1 | 7/2012 | Norton et al. | |
| 8,228,631 B1 | 7/2012 | Tsay et al. | |
| 8,233,239 B1 | 7/2012 | Teo et al. | |
| 8,248,733 B1 | 8/2012 | Radavicius et al. | |
| 8,259,417 B1 | 9/2012 | Ho et al. | |
| 8,274,760 B1 | 9/2012 | Zhang et al. | |
| 8,276,256 B1 | 10/2012 | Zhang et al. | |
| 8,279,560 B1 | 10/2012 | Pan | |
| 8,284,514 B1 | 10/2012 | Garbarino | |
| 8,289,646 B1 | 10/2012 | Heo et al. | |
| 8,300,352 B1 | 10/2012 | Larson et al. | |
| 8,305,708 B2 | 11/2012 | Tacklind | |
| 8,320,086 B1 | 11/2012 | Moradnouri et al. | |
| 8,322,021 B1 | 12/2012 | Berding et al. | |
| 8,345,387 B1 | 1/2013 | Nguyen | |
| 8,363,351 B1 | 1/2013 | Little | |
| 8,369,044 B2 | 2/2013 | Howie et al. | |
| 8,390,953 B2 * | 3/2013 | Tokunaga | 360/99.08 |
| 8,411,389 B1 | 4/2013 | Tian et al. | |
| 8,416,522 B1 | 4/2013 | Schott et al. | |
| 8,416,534 B1 | 4/2013 | Heo et al. | |
| 8,422,171 B1 | 4/2013 | Guerini | |
| 8,422,175 B1 | 4/2013 | Oveyssi | |
| 8,432,641 B1 | 4/2013 | Nguyen | |
| 8,437,101 B1 | 5/2013 | German et al. | |
| 8,438,721 B1 | 5/2013 | Sill | |
| 8,446,688 B1 | 5/2013 | Quines et al. | |
| 8,451,559 B1 | 5/2013 | Berding et al. | |
| 8,467,153 B1 | 6/2013 | Pan et al. | |
| 8,472,131 B1 | 6/2013 | Ou-Yang et al. | |
| 8,477,460 B1 | 7/2013 | Liebman | |
| 8,488,270 B2 | 7/2013 | Brause et al. | |
| 8,488,280 B1 | 7/2013 | Myers et al. | |
| 8,499,652 B1 | 8/2013 | Tran et al. | |
| 8,514,514 B1 | 8/2013 | Berding et al. | |
| 8,530,032 B1 | 9/2013 | Sevier et al. | |
| 8,542,465 B2 | 9/2013 | Liu et al. | |
| 8,547,664 B1 | 10/2013 | Foisy et al. | |
| 8,553,356 B1 | 10/2013 | Heo et al. | |
| 8,553,366 B1 | 10/2013 | Hanke | |
| 8,553,367 B1 | 10/2013 | Foisy et al. | |
| 8,616,900 B1 | 12/2013 | Lion | |
| 8,665,555 B1 | 3/2014 | Young et al. | |
| 8,667,667 B1 | 3/2014 | Nguyen et al. | |
| 8,693,139 B2 | 4/2014 | Tian et al. | |
| 8,693,140 B1 | 4/2014 | Weiher et al. | |
| 8,699,179 B1 | 4/2014 | Golgolab et al. | |
| 8,702,998 B1 | 4/2014 | Guerini | |
| 8,705,201 B2 | 4/2014 | Casey et al. | |
| 8,705,209 B2 | 4/2014 | Seymour et al. | |
| 8,717,706 B1 | 5/2014 | German et al. | |
| 8,743,509 B1 | 6/2014 | Heo et al. | |
| 8,755,148 B1 | 6/2014 | Howie et al. | |
| 8,756,776 B1 | 6/2014 | Chen et al. | |
| 8,760,800 B1 | 6/2014 | Brown et al. | |
| 8,760,814 B1 | 6/2014 | Pan et al. | |
| 8,760,816 B1 | 6/2014 | Myers et al. | |
| 8,773,812 B1 | 7/2014 | Gustafson et al. | |
| 8,780,491 B1 | 7/2014 | Perlas et al. | |
| 8,780,504 B1 | 7/2014 | Teo et al. | |
| 8,792,205 B1 | 7/2014 | Boye-Doe et al. | |
| 8,797,677 B2 | 8/2014 | Heo et al. | |
| 8,797,689 B1 | 8/2014 | Pan et al. | |
| 8,824,095 B1 | 9/2014 | Dougherty | |
| 8,824,098 B1 | 9/2014 | Huang et al. | |
| 2004/0071504 A1 * | 4/2004 | Harada | 403/274 |
| 2005/0185330 A1 * | 8/2005 | Lee et al. | 360/99.12 |
| 2008/0204929 A1 * | 8/2008 | Masazuki et al. | 360/110 |
| 2008/0218894 A1 * | 9/2008 | Tomita | 360/73.03 |
| 2009/0115275 A1 | 5/2009 | Higashihara et al. | |
| 2009/0129709 A1 | 5/2009 | Watanabe et al. | |
| 2009/0160277 A1 | 6/2009 | Obara | |
| 2011/0212281 A1 | 9/2011 | Jacoby et al. | |

(56) References Cited

U.S. PATENT DOCUMENTS

| | | |
|---|---|---|
| 2012/0230618 A1* | 9/2012 | Suzuki et al. ............... 384/120 |
| 2013/0038964 A1 | 2/2013 | Garbarino et al. |
| 2013/0091698 A1 | 4/2013 | Banshak, Jr. et al. |
| 2013/0140942 A1* | 6/2013 | Oh et al. ............... 310/261.1 |
| 2013/0155546 A1 | 6/2013 | Heo et al. |
| 2013/0241332 A1* | 9/2013 | Kim et al. ............... 310/90 |
| 2013/0290988 A1 | 10/2013 | Watson et al. |
| 2014/0265687 A1 | 9/2014 | Cheong et al. |

\* cited by examiner

ROTARY SPINDLE HAVING A DISK CLAMP BOTTOM LAND FACING AND IN CONTACT WITH A SHAFT TOP LAND

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. Magnetic hard disk drives typically store information on non-removable rigid magnetic disks. There are also optical disk drives, which typically retrieve information stored on removable optical disk media. Also for example, there are magneto-optical disk drives, which share some of the characteristics of optical disk drives and magnetic hard disk drives.

All types of disk drives typically include a spindle motor that supports and spins at least one annular disk media. Although past disk drive spindle motors utilized ball bearings, ball bearings have been replaced by fluid bearings in many contemporary disk drive spindle motors, for example to reduce non-repeatable runout, vibration, and/or acoustic noise.

The annular disk media is typically fitted over a rotatable disk mounting hub of the spindle, and clamped to the disk mounting hub by a disk clamp that is positioned at the top of the disk mounting hub and forced downward by the action of one or more fasteners. In most disk drive applications, the disk clamp is fastened by a plurality of fasteners that screw into the top of the disk mounting hub. However, in some disk drive applications, the disk clamp may be fastened by one central fastener that screws into a rotating spindle shaft. In such applications, the disk mounting hub is typically press-fit onto the rotating spindle shaft, and may also be bonded thereto. The press-fit interface may be subjected to stresses caused by the clamping force, and the press-fit assembly process may undesirably cause local plastic deformation of the hub.

A disk drive, especially one that is installed in a mobile device such as a laptop computer, is often subjected to mechanical shocks and sharp accelerations from impacts during non-operation. Such mechanical shocks and accelerations can further stress the disk clamp, and may even overcome the press-fit and bond that fixes a disk mounting hub to the rotating spindle shaft, causing undesirable slippage and/or spindle oil leak and contamination through the press-fit interface. The risk of such problems may be exacerbated by operating or non-operating temperature at or near the extremes of the disk drive's expected temperature range.

Therefore, there is a need in the art for an improved disk drive spindle design in which the press-fit interface and/or bond between a disk mounting hub and a rotating shaft has a bond strength that is better able to resist disk clamping loads and mechanical shocks throughout the expected operating and non-operating temperature range. There is also a need in the art for an improved disk drive spindle design that reduces the risk that the press-fit interface and/or bond between a disk mounting hub and a rotating shaft might allow an unacceptable amount of oil leakage from within the spindle. There is also a need in the art for an improved disk drive spindle design that can be mass-manufactured at acceptably low cost, and in which plastic deformation of the hub is reduced or eliminated during assembly.

DETAILED DESCRIPTION

Figure 1:
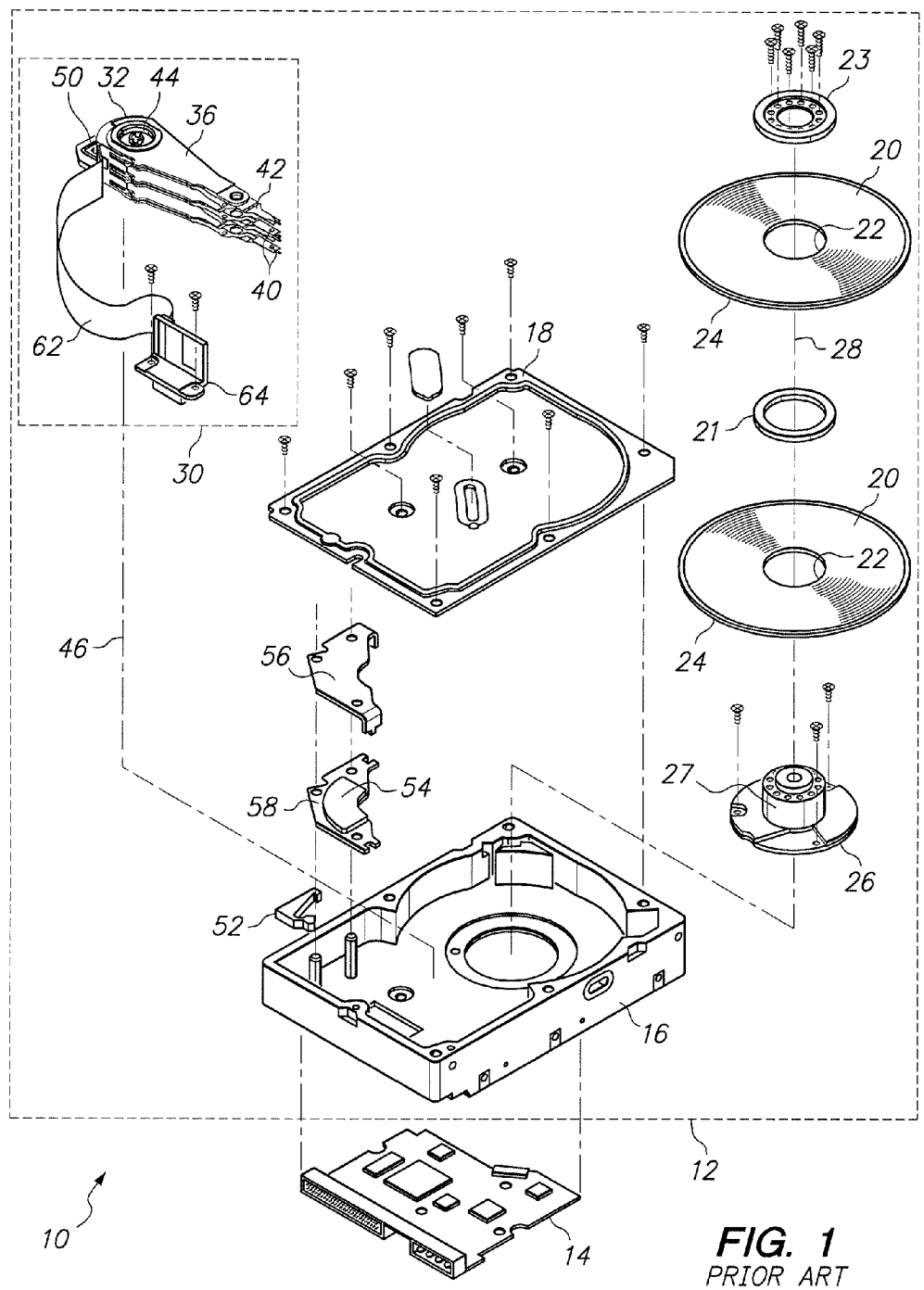
FIG. 1 is an exploded perspective view of a disk drive including a rotary spindle according to the prior art.

FIG. 1 is an exploded perspective view of a disk drive 10 including a rotary spindle 26 according to the prior art. The disk drive 10 includes a head disk assembly (HDA) 12 and a printed circuit board assembly (PCBA) 14. The HDA 12 includes a disk drive base 16 and cover 18 that together house disks 20. Each of the disks 20 may contain a plurality of concentric tracks for storing data, disposed upon its opposing disk major surfaces between an inner radial extent 22 and an outer radial extent 24.

In the example of FIG. 1, the rotary spindle 26 is attached to the disk drive base 16 of the HDA 12, and may include a disk mounting hub 27 upon which the disks 20 may be mounted. The rotary spindle 26 rotates the disks 20 about a disk axis of rotation 28. The disks 20 may be stacked and separated with one or more annular disk spacers 21, and clamped to the disk mounting hub 27 by a disk clamp 23. The HDA 12 further includes a head stack assembly (HSA) 30 pivotably attached to the disk drive base 16 of HDA 12 by use of a pivot bearing cartridge 44 that is engaged within a bore of an actuator body 32. The pivot bearing cartridge 44 may facilitate the HSA 30 to rotate relative to HDA 12 about an actuator pivot axis 46.

One or more actuator arms 36 may extend from the actuator body 32, and one or more head gimbal assemblies (HGA) 42 may be attached to a distal end of each actuator arm 36. Each HGA 42 may include a head 40 for reading and writing data from and to an adjacent disk surface. The HSA 30 may further include a coil 50. The coil 50 may interact with one or more magnets 54 attached to disk drive base 16 via a yoke structure 56, 58, to form a voice coil motor for controllably rotating the HSA 30. The HDA 12 also optionally includes a latch 52 pivotably mounted on the disk drive base 16 to limit the rotational movement of the HSA 30.

In the example of FIG. 1, the PCBA 14 may include a servo control system for generating servo control signals to control the current through the coil 50 and thereby position the HSA 30 relative to concentric tracks disposed upon the surfaces of disks 20. The HSA 30 may be electrically connected to PCBA 14 via a flex cable 62 and a flex cable support bracket 64 that attaches to the disk drive base 16.

Figure 2:
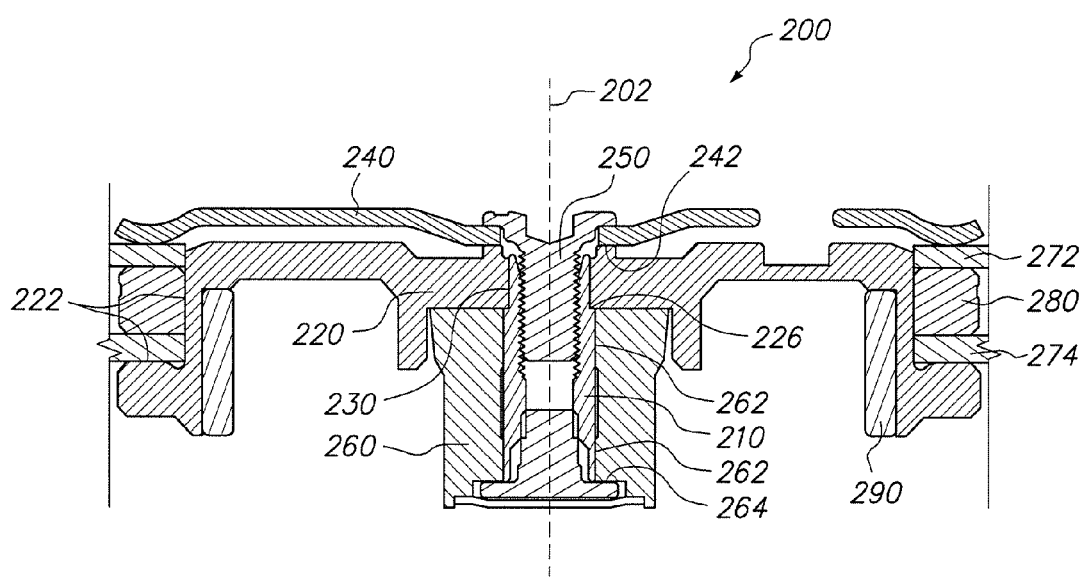
FIG. 2 is a partial cross-sectional view of a contemporary disk drive rotary spindle.

FIG. 2 is a partial cross-sectional view of a contemporary disk drive rotary spindle 200. The rotary spindle 200 includes a rotatable shaft 210 defining a shaft axis of rotation 202, and a disk mounting hub 220 having an outer disk mounting surface 222. A magnetic field acting upon magnet 290 torques the disk mounting hub 220 and the rotatable shaft 210 to rotate. The rotation of the rotatable shaft 210 is facilitated by a fluid bearing created in a thin layer of working fluid (e.g. bearing oil) between the rotatable shaft 210 and a fixed bearing member 260. Such fluid bearing may include journal bearing portions 262 and a thrust bearing portion 264.

The rotary spindle 200 also has a cylindrical hub-to-shaft press-fit interface 230 that is concentric about the shaft axis of rotation 202. In this context, the term "press-fit" is used as a common term of art that may describe a structural characteristic, rather than necessarily or merely referring to a process step. For example, the presence of residual radial compression at the hub-shaft interface 230 may be a tell-tale structural indication of a press-fit interface. Radial interference between the inner surface of the hub 220 and the outer surface of the shaft 210, at the hub-shaft interface 230, may also be a structural characteristic that is indicative of a press-fit interface. Hence, one of ordinary skill in the art will understand that "press-fit" (as used in this context) can be a structural characteristic that is discernable post-assembly and without prior knowledge of any specific assembly process. Accordingly, "press-fit" may be properly used as a structural limitation herein; it is not merely a process limitation.

A disk clamp 240 is fastened to the rotatable shaft 210 by a screw 250. The disk clamp 240 clamps two disks 272, 274 against the outer disk mounting surface 222 of the disk mounting hub 220, along with an annular spacer ring 280 that is disposed between the disks 272, 274. The disk clamp 240 has a clamp bottom land 242 that is in contact with the top of the disk mounting hub 220.

During assembly of the rotary spindle 200, the disk mounting hub 220 is press-fit onto a portion of the shaft 210, which results in a stress on the disk mounting hub 220 at the cylindrical hub-to-shaft interface 230. Such stress may vary from part to part because of manufacturing variation in part diameters and hence the required press-fit force, and in certain cases may undesirably cause excessive plastic deformation of the disk mounting hub 220 at the interior rim 226.

Figure 3A:
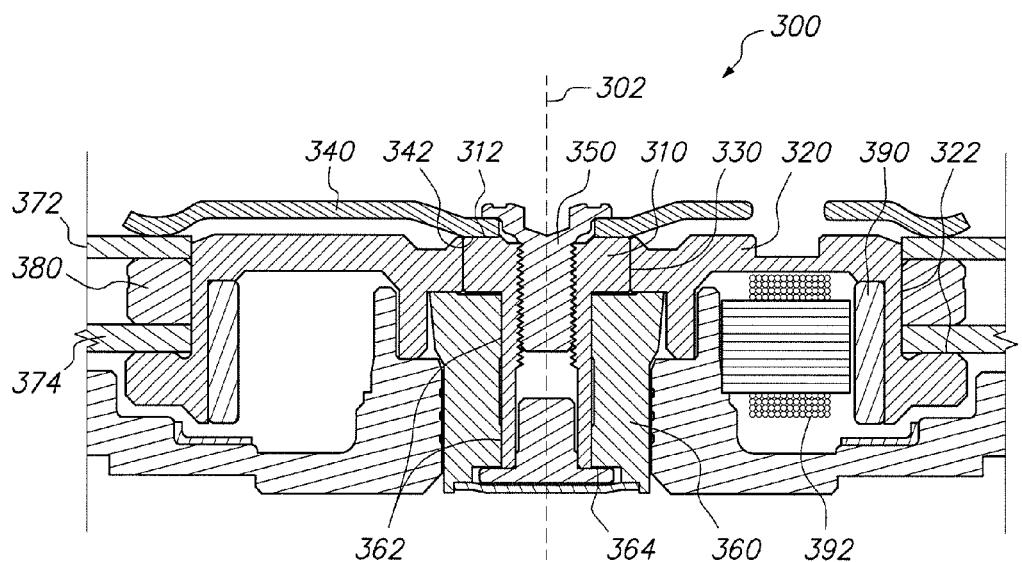
FIG. 3A is a partial cross-sectional view of a rotary spindle according to an example embodiment of the present invention.
Figure 3B:
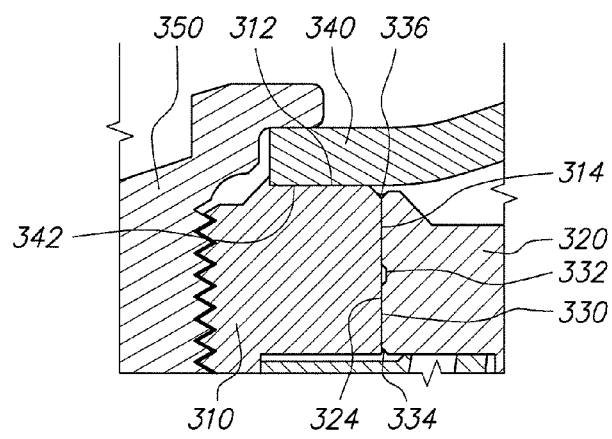
FIG. 3B is an expanded view of a portion of the cross section of FIG. 3A.

FIG. 3A is a partial cross-sectional view of a rotary spindle 300 according to an example embodiment of the present invention. FIG. 3B is an expanded view of a portion of the cross section of FIG. 3A. Now referring to FIGS. 3A and 3B, the rotary spindle 300 includes a rotatable shaft 310 defining a shaft axis of rotation 302, and having an annular shaft top land 312 that is normal to the shaft axis of rotation 302 (i.e. has a surface normal that is parallel to the shaft axis of rotation 302). In certain embodiments, the rotatable shaft 310 may comprise martensitic stainless steel.

In the embodiment of FIGS. 3A and 3B, the rotary spindle 300 also includes a disk mounting hub 320 having an outer disk mounting surface 322. In certain embodiments, the disk mounting hub 320 may comprise aluminum or ferritic stainless steel. Note that in the embodiment of FIGS. 3A and 3B, the disk mounting hub 320 and the rotatable shaft 310 are an assembly of subcomponents rather than being a monolithic single component that has material continuity.

A magnetic field from electrical current flow in coils 392, acting upon magnet 390, may torque the disk mounting hub 320 and the rotatable shaft 310 to rotate. The rotation of the rotatable shaft 310 is facilitated by a fluid bearing created in a thin layer of working fluid (e.g. bearing oil) between the rotatable shaft 310 and a fixed bearing member 360. Such fluid bearing may include journal bearing portions 362 and a thrust bearing portion 364.

In the embodiment of FIGS. 3A and 3B, the disk mounting hub 320 may have an inner cylindrical bore defined by an inner cylindrical surface 324 that faces and may be in radial compression with an outer cylindrical surface 314 of the rotatable shaft 310 at a cylindrical hub-to-shaft interface 330. Such radial compression may be structurally described as a press-fit interface, and may optionally result from a press-fit assembly process, or could be the result of differential thermal expansion or contraction after a temperature change, etc.

Note that in the present context, "cylindrical" does not imply constant radius along an entire axial length. Rather, the cylindrical hub-to-shaft interface 330 may be radially stepped, and so long as one or more segments are cylindrical, the interface is considered to be cylindrical herein. Accordingly, the inner cylindrical surface 324 is not necessarily the only inner cylindrical surface of the disk mounting hub 320 (e.g. the inner bore of the disk mounting hub 320 may be radially stepped). Likewise, the outer cylindrical surface 314 is not necessarily the only outer cylindrical surface of the rotatable hub 310 (e.g. the shaft may be stepped). The cylindrical hub-to-shaft press-fit interface 330 is preferably substantially concentric about the shaft axis of rotation 302.

In this context, the term "press-fit" is used as a common term of art that may describe a structural characteristic, rather than necessarily or merely referring to a process step. For example, the presence of residual radial compression at the hub-shaft interface 330 may be a tell-tale structural indication of a press-fit interface. Radial interference between the inner surface of the hub 320 and the outer surface of the shaft 310, at the hub-shaft interface 330, may also be a structural characteristic that is indicative of a press-fit interface. Hence, one of ordinary skill in the art will understand that "press-fit" (as used in this context) can be a structural characteristic that is discernable post-assembly and without prior knowledge of any specific assembly process. Accordingly, "press-fit" may be properly used as a structural limitation herein; it is not merely a process limitation.

A disk clamp 340 is fastened to the rotatable shaft 310 by a screw 350. The disk clamp 340 clamps two disks 372, 374 against the outer disk mounting surface 322 of the disk mounting hub 320, along with an annular spacer ring 380 that is disposed between the disks 372, 374. In the embodiment of FIGS. 3A and 3B, the disk clamp 340 has an annular clamp bottom land 342 that faces and is in contact with the shaft top land 312. Hence, in contrast with the example of FIG. 2, in the embodiment of FIGS. 3A and 3B the clamp 340 is bottomed on the shaft top land 312 (rather than being bottomed on the hub 320).

Having the disk clamp 340 bottomed on the rotary shaft 310 (rather than the disk clamping hub 320) can improve robustness to mechanical shocks, and thereby reduce the risk that the hub-to-shaft press-fit interface 330 might slip or allow an unacceptable amount of oil leakage from the interior fluid bearing. The clamp bottom land 342 is preferably parallel to the shaft top land 312. In the embodiment of FIGS. 3A and 3B, the shaft top land 312 is adjacent to the hub-to-shaft interface 330.

The cylindrical hub-to-shaft press-fit interface 330 may optionally include one or more circumferential grooves 332, 334, 336 that may contain an adhesive sealing material (e.g. a conventional low halogen epoxy or a conventional high temperature epoxy). The circumferential groove 332 may optionally be in the inner cylindrical surface 324 of the disk mounting hub 320, as shown in FIG. 3B. Alternatively, one or more of the circumferential grooves may be in the outer cylindrical surface 314 of the rotatable shaft 310. In the embodiment of FIG. 3B, the circumferential groove may have a groove depth in the range of 100 microns to 200 microns.

In certain embodiments, the cylindrical hub-to-shaft interface 330 may have a diameter in the range of 2 mm to 6 mm, which diameter is greater than that of the cylindrical hub-to-shaft interface 230 of FIG. 2. The greater diameter of the cylindrical hub-to-shaft interface 330 of FIG. 3A creates a greater total bond area between the disk mounting hub 320 and the rotatable shaft 310, and therefore increased bond strength. Such increased bond strength may better resist mechanical shocks throughout the expected operating and non-operating temperature range of the spindle 300, and thereby reduce the risk that the hub-to-shaft press-fit interface 330 might allow an unacceptable amount of oil leakage from the interior fluid bearing (after mechanical shock).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A rotary spindle comprising:
   a rotatable shaft defining a shaft axis of rotation, and having a shaft top land normal to the shaft axis of rotation;
   a disk mounting hub having an outer disk mounting surface, and having an inner cylindrical surface that faces and is in press-fit radial compression with an outer cylindrical surface of the shaft at a cylindrical hub-to-shaft interface, the cylindrical hub-to-shaft interface being concentric about the shaft axis of rotation; and
   a disk clamp fastened to the rotatable shaft, the disk clamp having a clamp bottom land that faces and is in contact with the shaft top land, the disk clamp not having bottom contact with the disk mounting hub;
   wherein the hub-to-shaft interface includes at least one circumferential groove that contains an adhesive sealing material.

2. The rotary spindle of claim 1, wherein each of the shaft top land and the clamp bottom land is annular.

3. The rotary spindle of claim 1, wherein the shaft top land is adjacent to the hub-to-shaft interface.

4. The rotary spindle of claim 1, wherein the circumferential groove is in the inner cylindrical surface of the disk mounting hub.

5. The rotary spindle of claim 1, wherein the circumferential groove has a groove depth in the range of 100 microns to 200 microns.

6. The rotary spindle of claim 1, wherein the adhesive sealing material comprises a low halogen epoxy or a high temperature epoxy.

7. The rotary spindle of claim 1, wherein the clamp bottom land is parallel to the shaft top land.

8. The rotary spindle of claim 1, wherein the cylindrical hub-to-shaft interface has a diameter in the range of 2 mm to 6 mm.

9. A disk drive comprising:
   a disk;
   a disk drive base;
   a spindle rotatably attached to the disk drive base, the spindle comprising;
      a rotatable shaft defining a shaft axis of rotation, and having a shaft top land normal to the shaft axis of rotation;
      a disk mounting hub having an outer disk mounting surface supporting the disk, the disk mounting hub having an inner cylindrical surface that faces and is in press-fit radial compression with an outer cylindrical surface of the shaft at a cylindrical hub-to-shaft interface, the cylindrical hub-to-shaft interface being concentric about the shaft axis of rotation; and
      a disk clamp fastened to the rotatable shaft, the disk clamp having a clamp inner region that includes a clamp bottom land that faces and is in contact with the shaft top land, the disk clamp not having bottom contact with the disk mounting hub, the disk clamp including a clamp outer region that imparts an axial compressive preload force on the disk;
      the hub-to-shaft interface includes at least one circumferential groove that contains an adhesive sealing material.

10. The disk drive of claim 9, wherein each of the shaft top land and the clamp bottom land is annular.

11. The disk drive of claim 9, wherein the shaft top land is adjacent to the hub-to-shaft interface.

12. The disk drive of claim 9, wherein the circumferential groove is in the inner cylindrical surface of the disk mounting hub.

13. The disk drive of claim 9, wherein the circumferential groove has a groove depth in the range of 100 microns to 200 microns.

14. The disk drive of claim 9, wherein the cylindrical hub-to-shaft interface has a diameter in the range of 2 mm to 6 mm.

15. The disk drive of claim 9, wherein the clamp bottom land is parallel to the shaft top land.

16. The disk drive of claim 9, wherein the spindle further comprises a fixed bearing member for establishing a fluid bearing between the rotatable shaft and the fixed bearing member.

* * * * *